US008109849B1

(12) United States Patent
Mason et al.

(10) Patent No.: US 8,109,849 B1
(45) Date of Patent: Feb. 7, 2012

(54) DEVICE FOR RELEASING TENSION FROM AUTO TENSIONING CYLINDER

(75) Inventors: James Mason, Lima, OH (US); Ryan M. Johnson, Paulding, OH (US); Freedus McDermitt, St. Marys, OH (US); Michael E. Patterson, Sidney, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1220 days.

(21) Appl. No.: 11/369,144

(22) Filed: Mar. 6, 2006

(51) Int. Cl.
*F16H 7/22* (2006.01)
*B23P 19/04* (2006.01)

(52) U.S. Cl. ........................ 474/130; 254/10.5
(58) Field of Classification Search .................. 474/130, 474/103–104; 254/10.5; 29/255, 252, 239
See application file for complete search history.

(56) References Cited

U.S. PATENT DOCUMENTS

| 3,724,841 | A | | 4/1973 | Hayes | |
|---|---|---|---|---|---|
| 3,814,382 | A | * | 6/1974 | Castoe | 254/10.5 |
| 3,902,698 | A | * | 9/1975 | Furrer et al. | 254/10.5 |
| 3,917,248 | A | * | 11/1975 | Mayer | 269/23 |
| 3,921,335 | A | * | 11/1975 | Hewitt et al. | 49/265 |
| 3,922,927 | A | | 12/1975 | Shiki et al. | |
| 4,034,960 | A | * | 7/1977 | Kloster | 254/10.5 |
| 4,767,385 | A | * | 8/1988 | Wilson | 474/138 |
| 4,802,883 | A | | 2/1989 | Tominaga et al. | |
| 4,863,417 | A | | 9/1989 | Kimata et al. | |
| 4,983,145 | A | | 1/1991 | Hirai et al. | |
| 5,401,216 | A | | 3/1995 | Fujikawa | |
| 5,544,730 | A | * | 8/1996 | Adrian et al. | 198/336 |
| 5,702,317 | A | | 12/1997 | Kawashima et al. | |
| 6,080,072 | A | | 6/2000 | Michikura et al. | |
| 6,135,906 | A | * | 10/2000 | Ichida | 474/82 |
| 6,334,827 | B1 | | 1/2002 | Tsuchiya | |
| 6,666,784 | B1 | * | 12/2003 | Iwamoto et al. | 474/109 |
| 2002/0183149 | A1 | * | 12/2002 | Temma et al. | 474/133 |
| 2005/0170923 | A1 | | 8/2005 | Hodjat | |
| 2005/0187052 | A1 | | 8/2005 | Yokoyama | |

* cited by examiner

*Primary Examiner* — Robert Siconolfi
*Assistant Examiner* — Anna Momper
(74) *Attorney, Agent, or Firm* — Rankin Hill & Clark LLP

(57) ABSTRACT

An apparatus for compressing an automatic belt tensioning cylinder to permit a belt to be placed around, the engine pulleys, includes a pneumatic cylinder and a jig, the jib being adapted to hold the tensioning cylinder during compression thereof by the pneumatic cylinder. The jig holds a plunger sensor that is operable to detect the presence of the tensioning cylinder, and to control the flow of pressurizing fluid such that the pneumatic cylinder cannot be operated in an extension direction when the tensioning cylinder is absent from the jig.

13 Claims, 6 Drawing Sheets

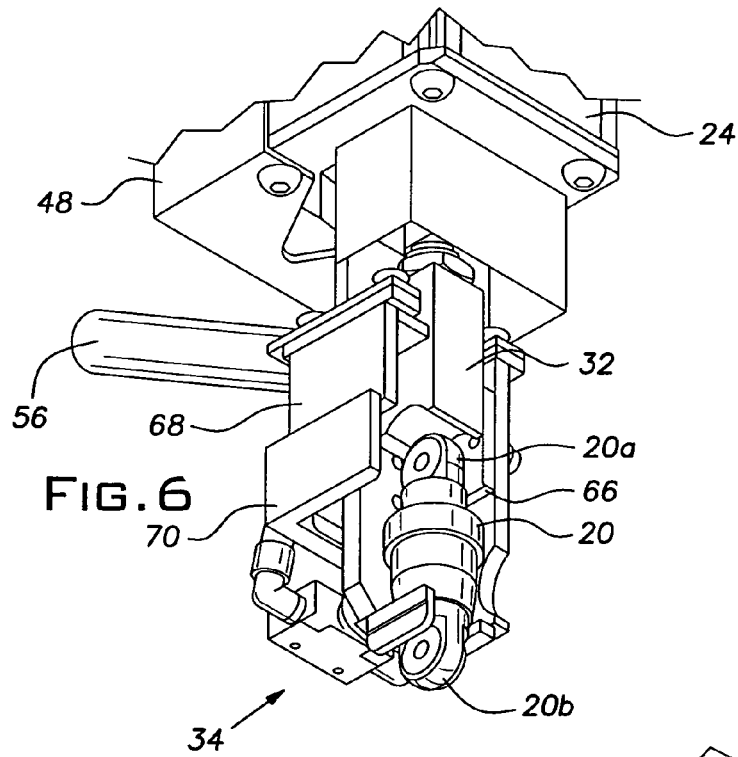
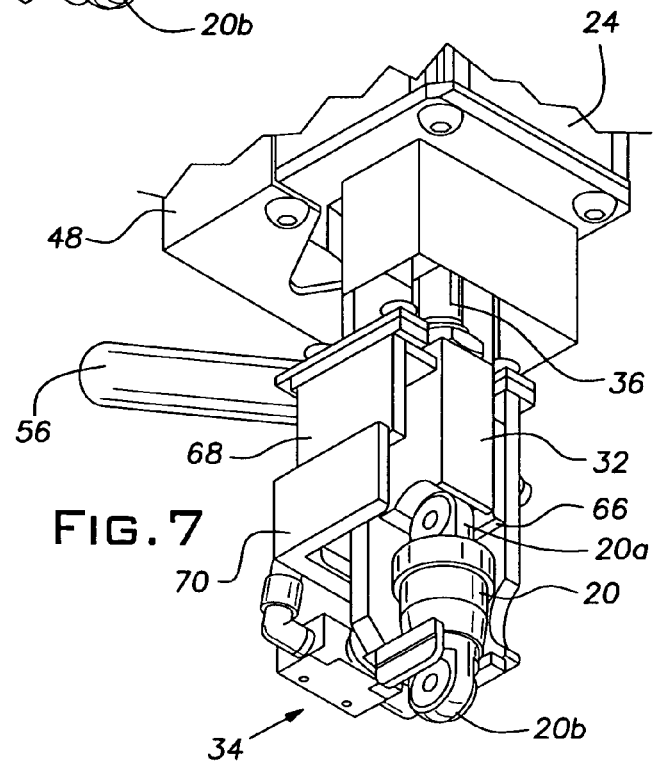

DEVICE FOR RELEASING TENSION FROM AUTO TENSIONING CYLINDER

BACKGROUND OF THE INVENTION

1. Field of the Invention

The present invention relates to engine assembly techniques and, more particularly, toward devices and methods for easing installation of a belt around engine pulleys.

2. Description of Related Art

During the assembly of automobile engines, it is necessary to wrap one or more belts around the engine pulleys. Such pulleys include a drive pulley, one or more driven pulleys, and idler pulleys. One or more of the idler pulleys is a tensioning pulley that is adjustable to maintain the belt at a predetermined tension, so as to reduce belt slippage and wear. However, during a belt installation process, the tension placed on the belt by the tensioning assembly makes it difficult or impossible to wrap the belt around the pulleys. Therefore, it is necessary to reduce or relieve the belt tension in order to permit the belt to be wrapped around the pulley.

The belt tensioning devices typically include a spring-biased piston that is disposed within a cylinder. With this arrangement, the cylinder is secured to a pulley mounting plate, while the free end of the piston is secured to a fixed support on the engine. The cylinder and piston are urged away from each other by the spring, and the pulley mounting plate and the pulley disposed thereon are moved, with the cylinder, away from the piston fixed support, so as to place tension on the belt that is disposed around the engine pulley.

However, to permit the belt to be placed around the pulleys, the belt tensioning device must be compressed or otherwise de-activated. When the belt tensioning device is compressed, the associated idler pulley may be moved so as to permit the belt to be placed therearound. Thereafter, the belt tensioning device may be released to return the idler pulley to its normal position and place the desired tension on the belt.

Unfortunately, it is difficult to manually compress or deactivate the belt tensioning device. In the past, compression clips have been used to hold the belt tensioning device in a collapsed or deactivated condition, but such compression clips are not useful in all applications. Also, it is known to use a lever to force the idler pulley mounting bracket to rotate against the spring bias of the belt tensioning device, and thereby move the idler tensioning pulley into a position to permit the belt to be placed therearound. Unfortunately, moving the bracket in this way requires a lot of force, and is a difficult operation for the belt installer. Furthermore, the installer will have to hold the lever with one hand while positioning the belt with the other hand, which is awkward at best.

Therefore, there exists a need in the art for a device and method for releasing or compressing a belt tensioning device so as to ease installation of a belt around the engine pulleys.

SUMMARY OF THE INVENTION

The present invention is directed toward a device and method for compressing an automatic belt tensioning cylinder, and thereby easing installation of a belt around the engine pulleys.

In accordance with the present invention, a tension releasing device includes a double acting pneumatic cylinder having a jig secured thereto. The jig is adapted to receive the tensioning cylinder and to hold the tensioning cylinder during compression thereof by the pneumatic cylinder. The pneumatic cylinder has a piston rod extending therefrom, and is operated to extend/retract the piston rod relative to the pneumatic cylinder. A distal end of the piston rod holds a pusher block. The pusher block cooperates with the jig to receive and hold the tensioning cylinder.

In further accordance with the present invention, the jig includes a sensor that detects whether the tensioning cylinder is received within the jig. Operation of the pneumatic cylinder is prevented when a tensioning cylinder is not detected by the sensor.

BRIEF DESCRIPTION OF THE DRAWINGS

These and further features of the invention will be apparent with reference to the following description and drawings, wherein:

FIG. 6 is a front perspective view of the tension releasing device according to the present invention with the tensioning cylinder received in the jig and in a normal or extended condition, and with other portions of the engine removed for purposes of clarity;

FIG. 7 is similar to FIG. 6, but illustrates the tension releasing device in an activated condition and with the tensioning cylinder in a compressed condition to permit placement of the belt around the pulleys;

DETAILED DESCRIPTION OF THE PREFERRED EMBODIMENTS

Figure 1A:
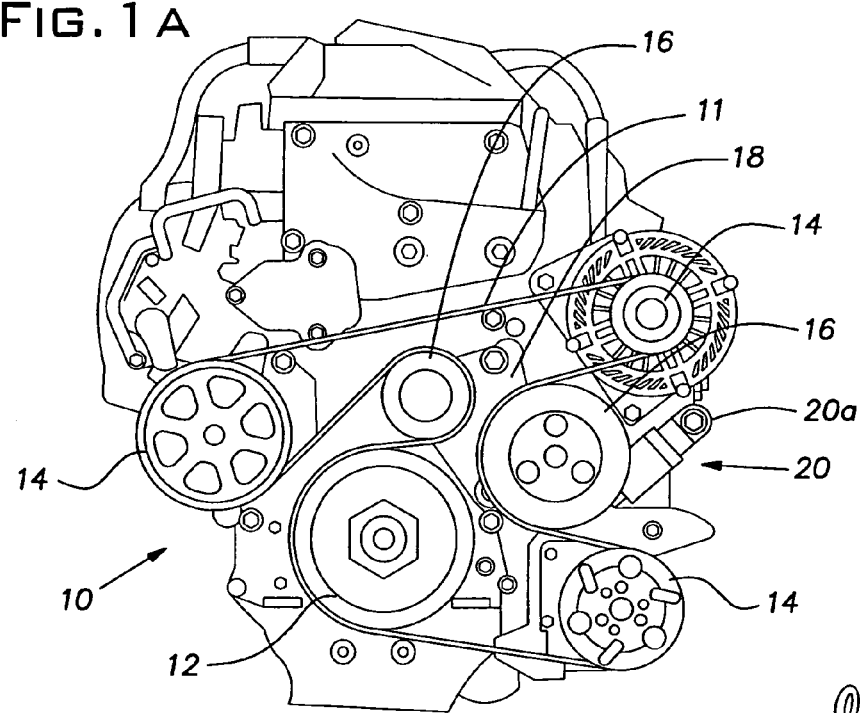
FIG. 1A is a front elevational view of an engine with a belt mounted around a series of drive, driven and idler tensioning pulleys.
Figure 1B:
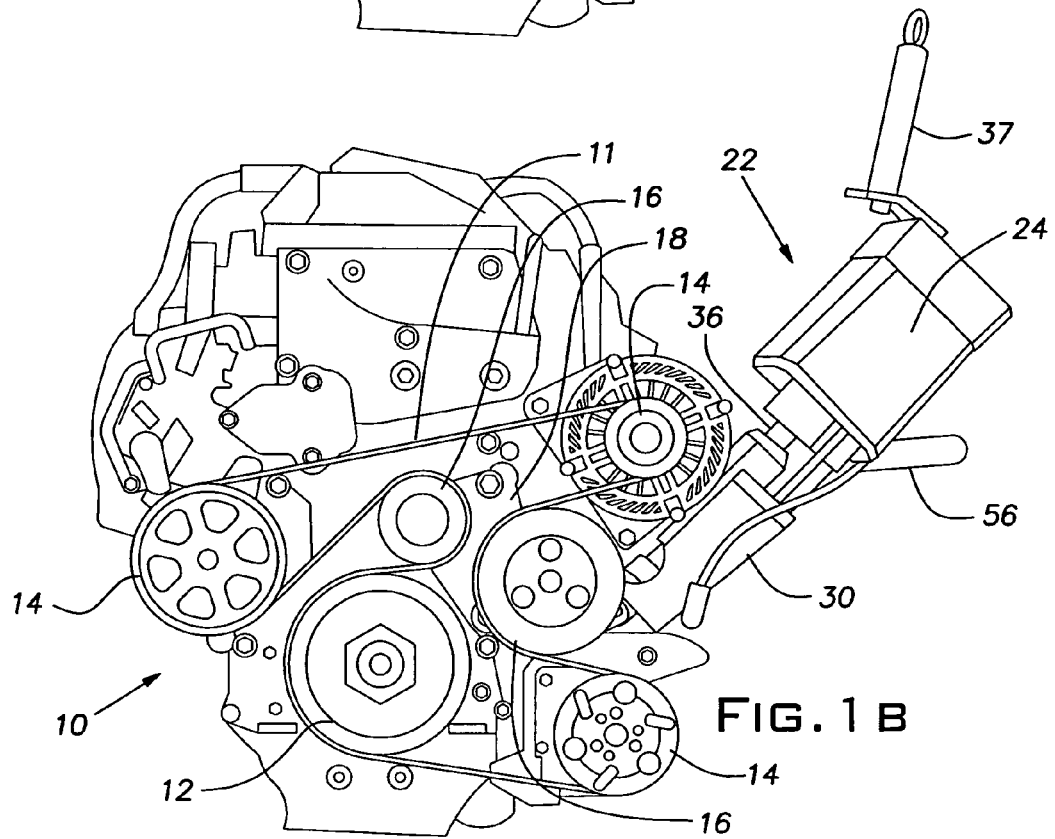
FIG. 1B is similar to FIG. 1A, but showing the tension releasing device disposed over an automatic belt tensioning cylinder.

With reference to FIGS. 1A and 1B, an engine 10 has a plurality of pulleys extending therefrom that are adapted to receive a belt 11. These pulleys include a drive pulley 12, one or more driven pulleys 14, and one or more idler pulleys 16. In the illustrated engine 10, both idler pulleys are tensioning pulleys 16, although this is not always the case. The tensioning pulleys 16 are mounted upon a mounting plate 18, and the mounting plate 18 is pivotally moved by an automatic belt tensioning cylinder 20. Normally, belt tension fluctuates during operation of the engine 10, and the tensioning cylinder 20 moves the mounting plate in response to these changes in belt tension so as to maintain a fairly constant tension on the belt 11, as is well known in the art.

The tensioning cylinder 20 has a first end 20a and a second end 20b. The tensioning cylinder first end 20a is attached to the engine 10 and thus is held in a fixed position. The tensioning cylinder second end 20b is attached to the mounting plate 18 and thus is movable relative to the first end 20a and the engine 10. A tension releasing device 22 of the present invention, described hereinafter, is adapted to compress or deactivate the tensioning cylinder 20 so as to ease installation of the belt 11 around the engine pulleys 12, 14, 16.

Figure 2:
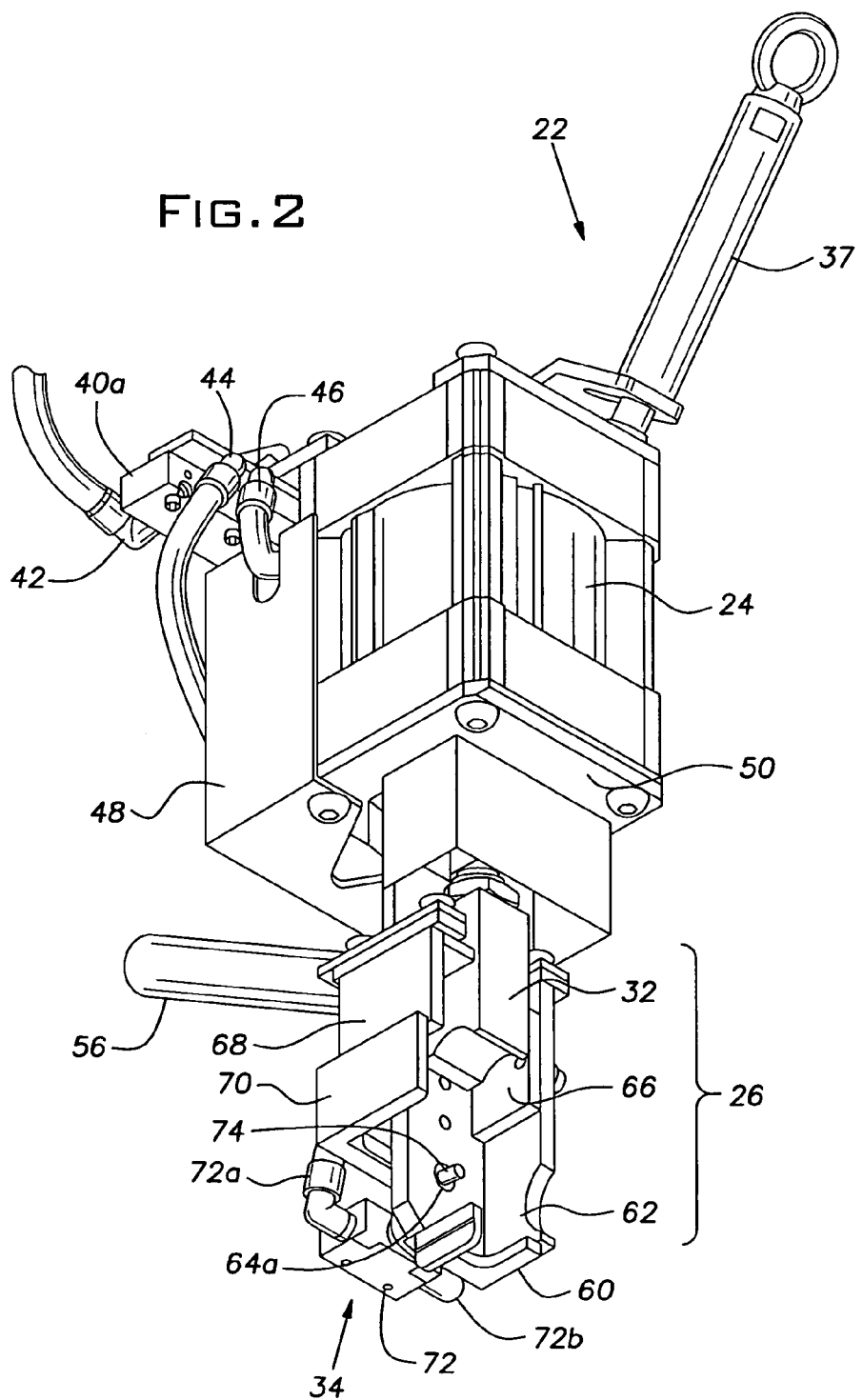
FIG. 2 is a front perspective view of the tension releasing device.
Figure 3:
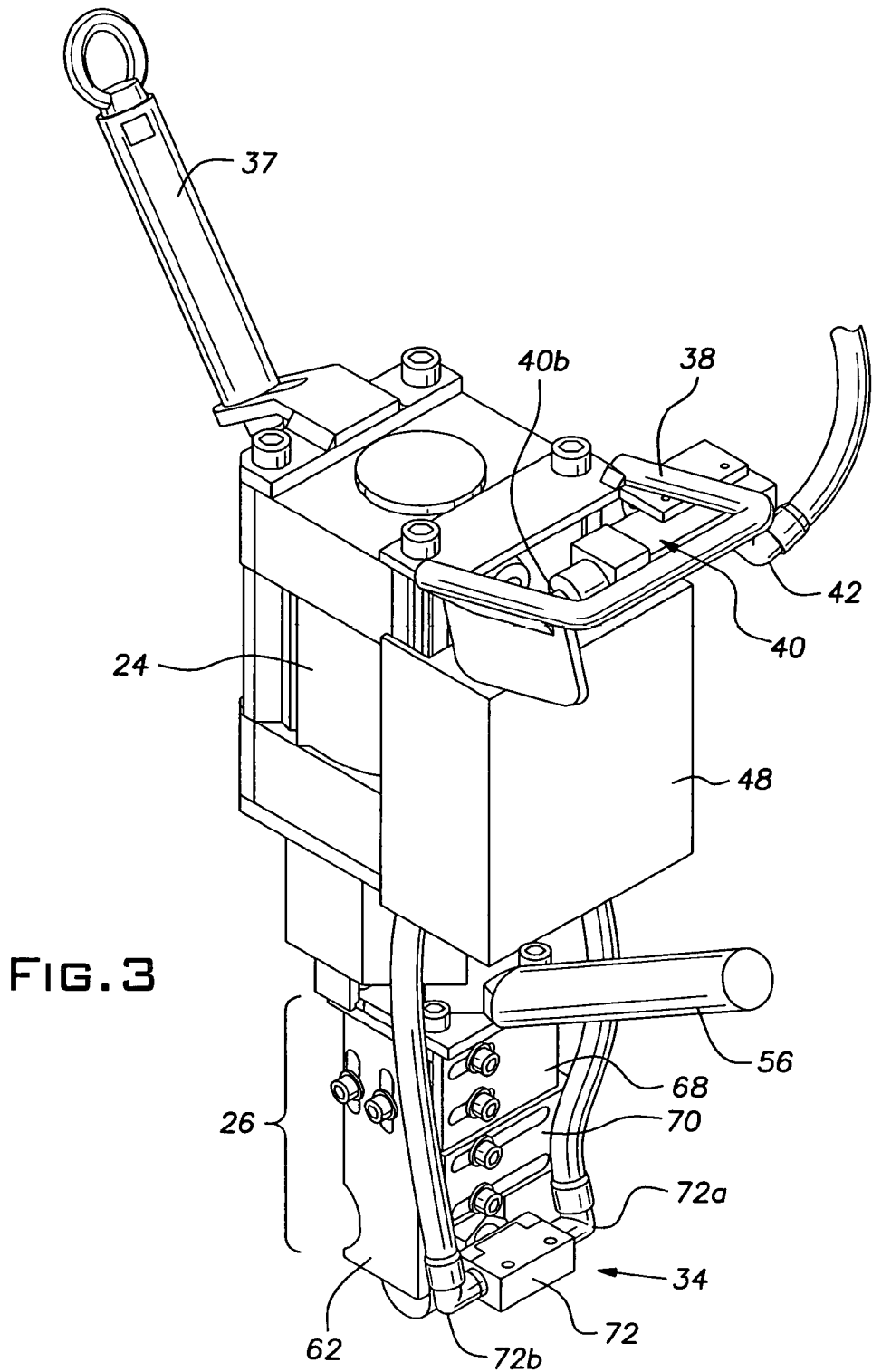
FIG. 3 is a rear perspective view of the tension releasing device.

With particular reference to FIGS. 2-3, the tension releasing device 22 of the present invention includes a double-acting pneumatic cylinder 24 and a jig 26, with the jig 26 being adapted to receive the tensioning cylinder 20. The jig 26 includes a cylinder weldment 28 (FIG. 4), a base weldment 30 (FIG. 5), a pusher block 32, and a sensor 34. As will be apparent from the following discussion, the jig 26 is integral with the pneumatic cylinder 24 in that the cylinder weldment 28 and base weldment 30 are secured to the pneumatic cylinder 24 and the pusher block 32 is secured to a free or distal end of a piston rod 36 extending from, and driven by, the pneumatic cylinder 24.

The pneumatic cylinder 24 includes a framework or body that provides mounting locations for the various handles, guards, and valves, as illustrated and described hereinafter, and to which the jig 26 is secured. More specifically, a hanger member 37 and a first handle 38 are attached to a top of the pneumatic cylinder 24, with the hanger member 37 extending upwardly from a first side of the pneumatic cylinder 24 and the first handle 38 extending rearwardly from a second side of the pneumatic cylinder 24. Relatively beneath the first handle 38, a toggle valve assembly 40 is mounted to a first vertical sidewall of the pneumatic cylinder 24.

The toggle valve assembly 40 includes a toggle valve body 40a from which a toggle valve switch 40b extends. The toggle valve body 40a includes a plant air input 42, first and second air outlets 44, 46, and a toggle valve (not shown) that is actuated or manipulated by the toggle valve switch 40b so as to control communication of pressurized air to the pneumatic cylinder 24 so as to control operation (extension/retraction) of the device 22. More particularly, the toggle valve controls communication of pressurized air from the plant air input 42 to the first and second air outlets 44, 46.

As will be appreciated by those skilled in the art, when the toggle valve switch 40b is moved in a first direction from a neutral position, pressurized air supplied to the toggle valve body 40a via the plant air input 42 is directed through the first outlet 44, the plunger valve 34, and a first flow restrictor 45, and is introduced into the pneumatic cylinder 24 on a first side of the piston and thereby drives the piston in a first direction (i.e., to extend the piston rod 36 and pusher block 32). On the other hand, when the toggle valve switch 40b is moved in a second direction from the neutral position, pressurized air supplied to the toggle valve body 40a via the plant air input 42 is directed through the second outlet 46 and a second flow restrictor 47 and is introduced into the pneumatic cylinder 24 on a second side of the piston and thereby drive the piston in a second direction (i.e., to retract the piston rod 36 and pusher block 32).

The first handle 38 includes a guard that helps to conceal and protect the toggle valve switch 40b so as to prevent unintended actuation thereof. A shield 48 is secured to the pneumatic cylinder 24 relatively beneath the first handle 38 and the toggle valve assembly 40 and serves to prevent tampering of the flow controls (i.e., the first and second flow restrictors 45, 47) mounted to the pneumatic cylinder 24, as described hereinafter.

Figure 4:
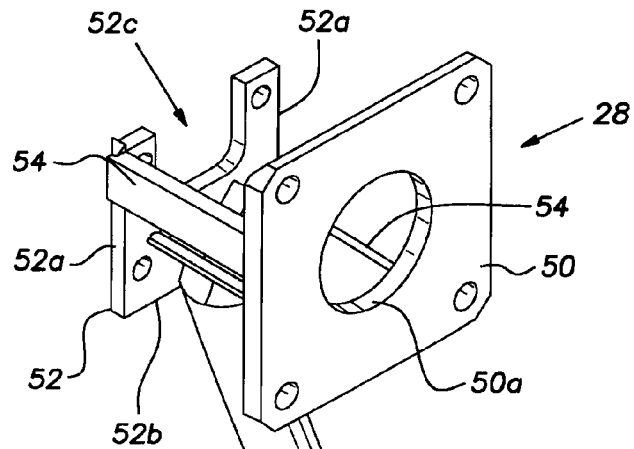
FIG. 4 is a perspective view of a cylinder weldment.
Figure 5:
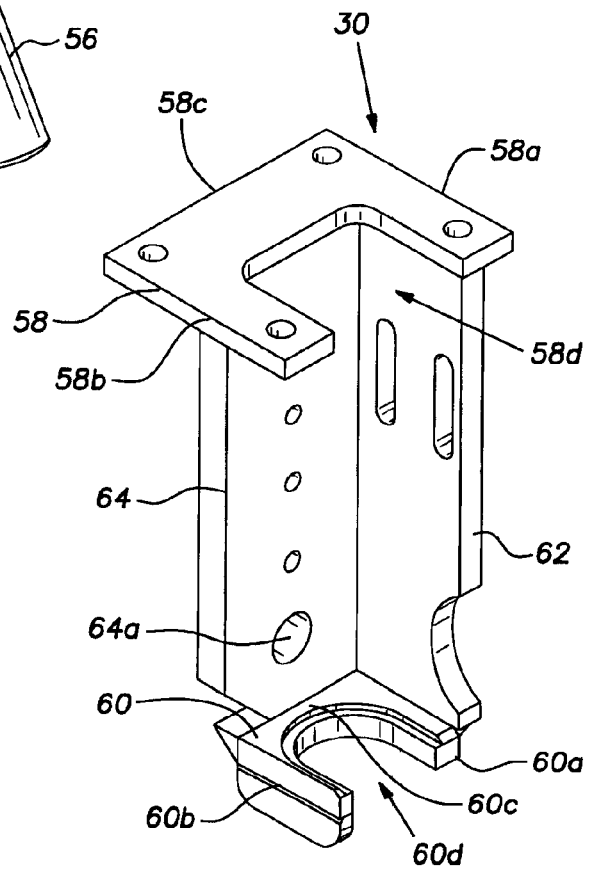
FIG. 5 is a perspective view of a base weldment.

With reference to FIG. 4, the cylinder weldment 28 includes an upper plate 50, a lower plate 52, a series of supports 54 extending between the upper and lower plates 50, 52, and a guide handle 56 extending outwardly from the lower plate 52. The guide handle 56 is disposed below the shield 48 on the second side of the pneumatic cylinder 24, and is directed outwardly and upwardly therefrom in spaced relation to the first handle 38, as illustrated.

The cylinder weldment upper plate 50 has a generally rectangular periphery, and has a circular hole 50a formed in the center thereof through which the piston rod 36 extends. Fasteners extending through corners of the upper plate 50 connect the upper plate 50 to a lower end of the pneumatic cylinder 24 in a face-to-face fashion, as illustrated in FIGS. 2-3.

The cylinder weldment lower plate 52 is somewhat u-shaped, having a pair of sides or arms 52a that are interconnected by a base or leg 52b so as to define a u-shaped opening 52c. The pusher block 32 secured to the free or distal end of the piston rod 36 is reciprocally movable within or through the u-shaped opening 52c, as will be described hereafter.

The base weldment 30 includes a u-shaped upper wall 58, a u-shaped lower wall 60, and first and second sidewalls 62, 64 interconnecting the upper and lower walls 58, 60. The base weldment upper wall 58 is mechanically affixed to the cylinder weldment lower plate 52 by a series of screws, as illustrated. It will be appreciated that the dimensions of the base weldment upper wall 58 are slightly smaller than the corresponding dimensions of the cylinder weldment lower plate 52.

The base weldment's u-shaped upper wall 58 includes a first arm 58a, a second arm 58b, and an interconnecting base or leg 58c. Similarly, the base weldment's u-shaped lower wall 60 has first and second arms 60a, 60b and an interconnecting base 60c. The u-shaped lower wall 60 is slightly smaller than, and offset from, the u-shaped upper wall 58, but the upper and lower u-shaped openings 58d, 60d provided by the u-shaped upper and lower walls 58, 60 are aligned with one another. The u-shaped lower wall 60 and, more specifically, the space within the base weldment 30, is adapted to receive the tensioning cylinder 20 and, as such, may be considered a custom part. While the space between the upper and lower u-shaped walls 58, 60 is important (to permit the tensioning cylinder 20 to be received therebetween), the space between the first and second arms 60a, 60b of the u-shaped lower wall 60 is chosen such that a first portion of the tensioning cylinder 20 may extend therethrough while a second portion of the auto tensioning cylinder 20 will rest thereon, as will be apparent from the discussion to follow. As such, the particular size, dimensions, etc. of the base weldment 30 are illustrative of a preferred embodiment adapted to a particular automatic belt tensioning cylinder 20, and it is contemplated that at least these physical characteristics of the present invention will be modified to accommodate different auto tensioning cylinders.

The first sidewall 62 extends between, and is integrally affixed to, the first arms 58a, 60a of the u-shaped upper and lower walls 58, 60. The first sidewall 62 includes a pair of lengthwise extending slots that permit adjustable securement of a wear pad 66 to an inner surface thereof. The second sidewall 64 extends between, and is integrally affixed to, the base or interconnecting leg 58c, 60c of the upper and lower u-shaped walls 58, 60. The second sidewall 64 has a plurality of tapped openings formed therein to which a guide 68 and a guard 70 are attached. More specifically, an upper pair of tapped openings permit an upper L-shaped guide 68 to be secured to the second sidewall 64, while the lower pair of tapped openings allow a lower L-shaped guard 70 to be secured thereto. It will be appreciated that the guide 68 and guard 70 have slotted openings that permit horizontal adjustment of the guide 68 and guard 70 relative to the base weldment second sidewall 64. Relatively below the tapped openings, the second sidewall 64 has an enlarged opening 64a formed therein to which the sensor 34 is mounted.

The sensor 34, which is sometimes called a plunger sensor or plunger valve, includes a body portion 72 having an air inlet 72a and an air outlet 72b. Between the air inlet 72a and air outlet 72b, the body 72 holds a valve (not shown) that is opened and closed by a spring-biased plunger 74 extending outwardly from the body portion 72. The plunger 74 is biased away from the body portion 72a toward a valve-closed position. The plunger 74 extends through the enlarged opening 64a in the second sidewall 64 so as to project into the interior of the jig 26. When a tensioning cylinder 20 is properly received within the interior of the jig 26, the plunger 74 will be depressed, opening the valve and thereby allowing pressurized air to pass through the sensor body portion 72 (i.e., from the body portion air inlet 72a to the body portion air outlet 72b).

Figure 8:
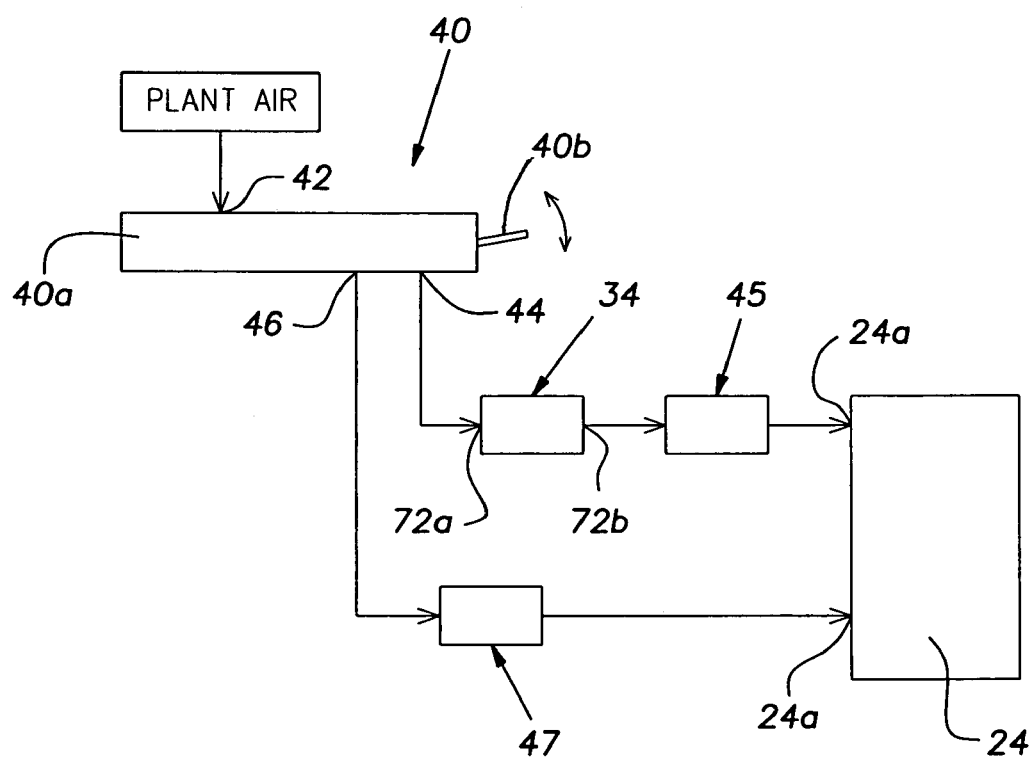
FIG. 8 schematically illustrates a pneumatic circuit of the tension releasing device of the present invention.

The pneumatic circuit for the tensioning releasing device 22 is fairly simple, and is schematically illustrated in FIG. 8, and will be discussed hereafter as it relates to operation of the device 22.

Plant air is introduced into toggle valve body 40a via the inlet 42 and is directed toward one side or the other of the pneumatic cylinder 24, depending upon the direction of actuation of the toggle valve switch 40b, described previously. When the tensioning cylinder 20 is detected in the jig 26 by depression of the plunger sensor 34, and the toggle valve switch 40b is moved in the first direction, pressurized air flows through the first flow restrictor 45 and is introduced into the pneumatic cylinder 24 via an extend port 24a so as to extend the piston rod 36 and the pusher block 32. The first flow restrictor 45 is adjustable so as to selectively limit or adjust the pressurized air flow into the pneumatic cylinder 24 and thereby permit the cylinder extension speed to be adjusted.

It has been found that, in order to prevent damage to the tensioning cylinder 20, it is important to not compress the tensioning cylinder too fast. In the present invention, the speed of movement of the pneumatic cylinder 24 is adjusted by the first flow restrictor 45 so that the tensioning cylinder rate of compression is adjusted so as to not damage the tensioning cylinder. In the illustrated embodiment, the maximum stroke of the pneumatic cylinder 24 is about 30 mm, with the maximum compression of the tensioning cylinder 20 being about 16 mm. The tensioning cylinder compression stroke takes at least 3 seconds.

Since the first end 20a of the tensioning cylinder 20 is immovably fixed to the engine 10, when the pusher block 32 engages the first end 20a of the tensioning cylinder 20, the jig 26 and the second end 20b of the tensioning cylinder 20 are drawn upwardly or toward the pneumatic cylinder 24, compressing the tensioning cylinder 20 and pivoting the mounting plate 18, and the tensioning pulleys 16 disposed thereon, into a position that eases placement of the belt 11 around the engine pulleys. Once the belt 11 is placed around the pulleys 12, 14, 16, the toggle valve switch 40b is actuated in the opposite direction to direct pressurized air through the second flow restrictor 25 and into the pneumatic cylinder 24 via the retract port 24b so as to drive the piston rod 36 and pusher block 32 toward the pneumatic cylinder 24, release the tensioning cylinder 20 from the jig 26, and permit removal of the tension releasing device 22 from the tensioning cylinder 20. The second flow restrictor 47 may be considered optional as it may not be necessary or desirable to reduce or limit the speed of decompression of the tensioning cylinder 20.

The preferred embodiment of the present invention has been described herein, but it is considered apparent that the invention is capable of numerous modifications or rearrangements of parts without departing from the spirit of the invention. Although the invention has been described herein as it relates to a drive device including the preferred pneumatic cylinder, it is considered apparent that the pneumatic (air) cylinder may be replaced by a hydraulic cylinder or an electric drive device (e.g., motor, gear reducer, transmission) without departing from the scope and spirit of the present invention. It is also contemplated that one skilled in the art may modify the pneumatic circuit to replace the flow restrictors with different means to adjust the speed of operation of the pneumatic cylinder, or that a single flow restrictor or means to adjust the speed of operation (i.e., in only the cylinder extension direction) may be desired. It is further considered apparent that the jig described herein is specially adapted to the particular tensioning cylinder used herein, and may be freely modified as necessary to accommodate different tensioning cylinders. Therefore, the present disclosure is not to be interpreted in a limitative fashion as the scope of the present invention is only defined by the claims appended hereto, which are to be given their broadest possible interpretation.

What is claimed is:

1. A device for compressing an automatic belt tensioning cylinder on an engine comprising:
    a pneumatic cylinder having a cylinder body and a piston rod having an end selectively extendable from the cylinder body;
    a toggle valve assembly that is operable to supply pressurized air to said pneumatic cylinder so as to selectively extend the piston rod from the cylinder body or retract the piston rod into the cylinder body; and,
    a jig assembly having a first wall affixed to the cylinder body and adapted to receive the piston rod, a pusher block secured to the extendable end of the piston rod, and a second wall opposite the first wall, the jig assembly receiving the tensioning cylinder between the pusher block and the second wall such that upon extension of the piston rod the tensioning cylinder is compressed between the pusher block and the second wall, wherein a first end of the tensioning cylinder is fixed on the engine and is received against the pusher block, and a second end of the tensioning cylinder is engaged by the second wall and is moved toward the first end of the tensioning cylinder as the piston rod extends from the cylinder body to compress the tensioning cylinder and release tension on a belt tensioned by the tensioning cylinder.

2. The device according to claim 1, further comprising a sensor secured to said jig assembly and adapted to sense whether the tensioning cylinder is properly received in said jig assembly.

3. The device according to claim 2, wherein said sensor is fluidly disposed between a first output port of said toggle valve assembly and a first input of said pneumatic cylinder.

4. The device according to claim 3, wherein said first input of said pneumatic cylinder is a piston rod extending port.

5. The device according to claim 4, further comprising a first flow restrictor fluidly disposed upstream of said pneumatic cylinder first input and adjustable to control a rate of piston rod extension.

6. The device according to claim 5, wherein a second output of said toggle valve assembly is fluidly connected to a retract port of said pneumatic cylinder.

7. The device according to claim 6, further comprising a second flow restrictor fluidly disposed upstream of said pneumatic cylinder retract port and adjustable to control a rate of piston rod retraction.

8. The device according to claim 4, further comprising a flow restrictor fluidly connected to said pneumatic cylinder and adjustably operable to control a rate of piston rod extension.

9. A device for compressing an automatic belt tensioning cylinder fixedly mounted to a vehicle engine for applying tension on a belt of the engine, comprising:
- a drive device including a body and a piston rod extendable relative to the body;
- an actuator that is operable to activate the drive device to selectively extend and retract said piston rod relative to the body; and,
- a jig affixed to the drive device and adapted to receive the piston rod, the jig including a pusher block fixedly secured to an end of the piston rod, and a lower wall fixedly secured to the body, the jig adapted to receive the tensioning cylinder such that upon extension of the piston rod, the tensioning cylinder is compressed between the pusher block and the lower wall, wherein the pusher block engages a first end of the tensioning cylinder fixedly mounted to the vehicle engine and the lower wall engages the second end of the tensioning cylinder that is movable relative to the first end of the tensioning cylinder and relative to the vehicle engine, the lower end moving the second end of the tensioning cylinder toward the first end to release tension on the belt.

10. The device according to claim 9, wherein the drive device is a pneumatic cylinder, the driven element is a piston rod, and the actuator is an air valve.

11. The device of claim 9 wherein the body includes a handle for manipulating the body and to receive the tensioning cylinder in the jig.

12. A method for compressing an automatic belt tensioning cylinder so as to permit a belt to be placed around a plurality of engine pulleys, comprising the steps of:
- positioning a tension releasing device over said tensioning cylinder that is mounted to a vehicle engine;
- actuating a valve assembly of the tension releasing device;
- supplying pressurized air to a pneumatic cylinder upon actuating of the valve assembly;
- extending a piston rod from said pneumatic cylinder with the supplied pressurized air; and
- compressing said tensioning cylinder mounted to the vehicle engine between a pusher block attached to an end of the piston rod and a lower wall of a jig attached to said pneumatic cylinder to release tension on the belt, and
- moving the lower wall of the jig in a direction toward the pusher block attached to the end of the piston rod of the pneumatic cylinder as the piston rod is extended from the pneumatic cylinder.

13. The method according to claim 12, further comprising the step of adjusting a rate of supply of pressurized air into said pneumatic cylinder so as to adjust a stroke speed of said pneumatic cylinder.

* * * * *